United States Patent [19]
Bruce et al.

[11] Patent Number: 5,483,613
[45] Date of Patent: Jan. 9, 1996

[54] OPTICAL DEVICE WITH SUBSTRATE AND WAVEGUIDE STRUCTURE HAVING THERMAL MATCHING INTERFACES

[75] Inventors: Allan J. Bruce, Westfield; Herman M. Presby, Highland Park, both of N.J.

[73] Assignee: AT&T Corp., Murray Hill, N.J.

[21] Appl. No.: 291,387

[22] Filed: Aug. 16, 1994

[51] Int. Cl.⁶ ................................................. G02B 6/10
[52] U.S. Cl. ............................................................ 385/129
[58] Field of Search ............................... 385/130, 129, 385/131, 132

[56] References Cited

U.S. PATENT DOCUMENTS

| 4,781,424 | 11/1988 | Kawachi et al. | 385/132 |
| 5,206,925 | 4/1993 | Nakazawa et al. | 385/130 X |
| 5,261,022 | 11/1993 | Sun et al. | 385/130 |

OTHER PUBLICATIONS

C. H. Henry et al., "Glass Waveguides on Silicon for Hybrid Optical Packaging," *Journal of Lightwave Technology*, vol. 7, No. 10, pp. 1530–1539 (1989)(No Month).

M. Kawachi, "Silica Waveguides on silicon and their application to integrated–optic components," *Optical and Quantum Electronics*, vol. 22, pp. 391–416 (1990)(No Month).

Primary Examiner—Akm E. Ullah
Attorney, Agent, or Firm—John M. Harman

[57] ABSTRACT

The present invention provides polarization-independent optical devices by reducing or eliminating strain-induced birefrigence associated with prior device structures. In a first embodiment, an optical device is produced comprising a doped silica substrate having a coefficient of thermal expansion between $8\times10^{-7}$ °$C.^{-1}$ and $15\times10^{-7}$ °$C.^{-1}$. On the doped silica substrate is formed a doped silica waveguiding structure having a coefficient of thermal expansion between $8\times10^{-7}$ °$C.^{-1}$ and $15\times10^{-7}$ °$C.^{-1}$. Alternatively, the coefficient of thermal expansion of the doped silica substrate is selected to be approximately 90% to 110% of the coefficient of thermal expansion of the doped silica waveguiding structure. In another aspect, the present invention provides an optical device comprising a doped silica substrate having a doping gradient from a lower surface to an upper surface. The doping level at the upper surface has a coefficient of thermal expansion approximating the coefficient of thermal expansion of a doped silica waveguiding structure formed thereon.

15 Claims, 1 Drawing Sheet

OPTICAL DEVICE WITH SUBSTRATE AND WAVEGUIDE STRUCTURE HAVING THERMAL MATCHING INTERFACES

BACKGROUND

1. Technical Field of the Invention

The invention relates to polarization-independent integrated optical devices and, more particularly, to polarization-independent optical devices employing substrates having coefficients of thermal expansion approximating that of subsequently-deposited doped glass layer(s).

2. Background

As optical fiber communication channels replace metal cable and microwave transmission links, integrated optical devices for directly processing optical signals become increasingly important. A useful approach to optical signal processing employs integrated glass waveguide structures formed on silicon substrates. The basic structure of such devices is described in C. H. Henry et al., "Glass Waveguides on Silicon for Hybrid Optical Packaging," 7 *J. Lightwave Tech.*, pp. 1530–1539 (1989), the disclosure of which is incorporated by reference herein. Integrated glass waveguide structures are typically formed by depositing a base layer of silicon dioxide on a silicon substrate followed by deposition of a doped silica layer on the silicon dioxide to form a waveguide core. The doped silica core layer is patterned using standard lithographic techniques to form a desired waveguide structure. For single mode waveguide structures, the core layer is approximately 6–8 microns thick and 5–7 microns wide. Following patterning of the core layer, an additional layer of silica is deposited to act as a top cladding. Depending upon the precise configuration of the waveguide, such devices can perform a variety of functions such as beam-splitting, tapping, multiplexing, demultiplexing, and filtering.

One drawback of the above waveguide structures is strain-induced birefrigence in the waveguide core. Compressive strain is introduced during fabrication due to different thermal expansion between silicon and silica. Due to this birefrigence, different polarization modes of transmitted light are presented with different effective indices of refraction. Specifically, the transverse magnetic (TM) mode encounters a greater refractive index than does the transverse electric (TE) mode, adversely affecting the transmission of the light and the performance of the waveguide circuit. This effect in which the two components of the polarization travel at different velocities is further aggravated by curves in the waveguide, since optical modes are shifted radially outward when traversing a curve. A mode loosely bound to the waveguide core (TM) will experience a greater outward shift than a mode more tightly bound (TM). Consequently, the loosely bound mode has a greater optical path and phase.

Elimination of birefrigence has long been recognized as necessary for high-performance optical devices. The art is replete with procedures for reducing or compensating for the compressive strain induced by the silicon/silica thermal mismatch. One approach involves deposition of a thick amorphous silicon layer on the waveguide followed by trimming with a high power laser. See M. Kawachi et al., "Laser Trimming Adjustment of Waveguide Birefrigence in Silica Integrated Optic Ring Resonators," *Proc. CLEO '89*, Tu J. (17) (Apr., 1989). In another approach, deep grooves on the order of 60 microns are etched adjacent the waveguide to release strain. Both these techniques require extreme precision, and significantly increase manufacturing costs. Additionally, these techniques attempt to correct the strain induced by processing without addressing the fundamental problem—thermal mismatch among the materials of the waveguide structure.

There is a need in the art for integrated optical waveguide structures and methods for their manufacture having minimal strain-induced birefrigence. Such structures could be used to produce polarization-independent integrated optical devices.

SUMMARY OF THE INVENTION

The present invention provides polarization-independent optical devices by reducing or eliminating strain-induced birefrigence associated with prior device structures. In the inventive devices, doped silica substrates rather than silicon wafers support the doped silica waveguiding structure. In a first embodiment, an optical device is produced comprising a doped silica substrate having a coefficient of thermal expansion between $8 \times 10^{-7}$ °$C.^{-1}$ and $15 \times 10^{-7}$ °$C.^{-1}$. On the doped silica substrate is formed a doped silica waveguiding structure having a coefficient of thermal expansion between $8 \times 10^{-7}$ °$C.^{-1}$ and $15 \times 10^{-7}$ °$C.^{-1}$. A cladding layer is formed on the doped silica waveguiding structure. Alternatively, the coefficient of thermal expansion of the doped silica substrate is selected to be approximately 90% to 110% of the coefficient of thermal expansion of the doped silica waveguiding structure.

In another aspect, the present invention provides an optical device comprising a doped silica substrate having a doping gradient from a lower surface to an upper surface. Optionally, the lower surface is pure silica. The doping level at the upper surface has a coefficient of thermal expansion approximating the coefficient of thermal expansion of a doped silica waveguiding structure formed thereon. A cladding layer is formed on the doped silica waveguiding structure.

DETAILED DESCRIPTION

Figure 1:
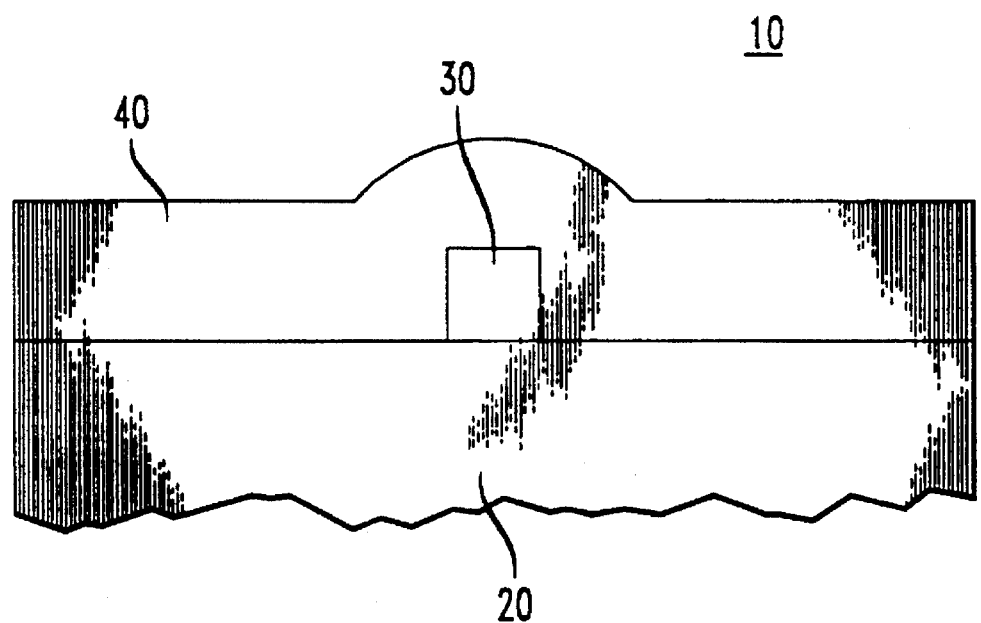
FIG. 1 is a schematic cross-sectional view of an optical device according to the present invention.

Referring to the drawings, FIG. 1 is a schematic view of an optical device 10 having a substrate 20, a waveguiding element 30, and a cladding layer 40. In conventional applications, substrate 20 is typically a silicon wafer with a thermally oxidized $SiO_2$ surface layer. The $SiO_2$ layer in such devices functions as a first cladding layer for the waveguiding element. In a first embodiment of the present invention, layer 20 is a doped silica substrate, the doped silica substrate having a coefficient of thermal expansion which approximates the coefficient of thermal expansion of the waveguiding element material layer.

By "approximating the coefficient of thermal expansion" it is meant that the coefficient of thermal expansion of the doped silica substrate is about 90% to 110% that of the waveguiding element material layer. For a waveguiding element material layer of phosphorus-doped silica, this translates to a doped silica substrate having a coefficient of thermal expansion between $8 \times 10^{-7}$ °$C.^{-1}$ and $15 \times 10^{-7}$ °$C.^{-}$, depending upon the exact composition of the waveguiding element material. By approximating the coefficient of thermal expansion of the waveguiding element material, strain-induced birefrigence is substantially reduced or eliminated. When the waveguiding element layer is deposited, typically at temperatures of 1000°–1300° C., the doped silica substrate and the waveguide element layer contract the same amount as they cool, resulting in substantial elimination of thermally-induced strain caused by different degrees of contraction.

The desired coefficient of thermal expansion is typically achieved through doping of silica with 1–2 mole % fluorine, 1–2 mole % phosphorus, 1–2 mole % titanium, or a combination of fluorine and titanium doping. While the above dopants are exemplary, it is noted that any dopants or combination of dopants which provide coefficients in the above range are within the scope of the present invention. Doping levels should be sufficiently low such that the doped silica substrate has a softening temperature approaching that of pure silica (i.e., approximately 1150° C.), enabling the substrate to withstand subsequent processing temperatures used to deposit the waveguiding and cladding layers, i.e., on the order of 1000° C. for chemical vapor deposition or 1300° C. for flame hydrolysis deposition.

In this embodiment, the substrate functions as both the substrate and the first cladding layer of the waveguiding device. Because the doped silica substrate also functions as the lower cladding layer, the index of refraction should be between approximately 1.45 and 1.46 to effectively confine the transmission radiation within waveguiding element 30. For the above dopants and doping levels, the refractive index of substrate 20 is between 1.458 and 1.459.

Doped silica substrate 20 is typically on the order of 0.5–1.0 mm in thickness. This thickness provides sufficient underlying support for the finished device as well as providing mechanical stability for the device during processing. The doped silica is formed through any known glass-forming technique including, but not limited to chemical vapor deposition, flame hydrolysis, sol-gel techniques, and batch-forming melting processes.

In a further embodiment of the present invention, substrate 20 is a graded doped silica having a doping gradient from a lower surface to an upper surface which contacts the waveguiding element. The doping level at the upper surface is selected to have a coefficient of thermal expansion approximately 90% to 110% of the coefficient of thermal expansion of waveguiding element 30. By using a substrate having graded doping levels, a higher softening temperature is obtained resulting in greater mechanical integrity of the substrate during processing.

The dopants used in the graded-doping substrate are the same as those discussed above, i.e., fluorine, phosphorus and titanium. The substrate is fabricated through a vapor-phase process such as chemical vapor deposition or flame hydrolysis during which the desired dopant is gradually increased with increasing thickness of the substrate.

The waveguides formed on the doped silica substrates of the present invention are employed in numerous optical devices. These devices include, but are not limited to, optical filters, multiplexers, demultiplexers, beam splitters, and optical taps. The embodiments of the present invention find use in any planar optical waveguide which comprises a waveguiding layer disposed on a cladding layer.

While the foregoing invention has been described in term of the above detailed embodiments, it will be readily apparent to those skilled in the art that various additions and changes can be made. Accordingly, modifications such as those suggested above, but not limited thereto, are considered to be within the scope of the claimed invention.

What is claimed is:

1. An optical device comprising:
   a doped silica substrate, the doped silica substrate having a coefficient of thermal expansion between $8 \times 10^{-7}$ °$C.^{-1}$ and $15 \times 10^{-7}$ °$C.^{-1}$;
   a doped silica waveguiding structure formed on the doped silica substrate, the doped silica waveguiding structure having a coefficient of thermal expansion between $8 \times 10^{-7}$ °$C.^{-1}$ and $15 \times 10^{-7}$ °$C.^{-1}$; and
   a cladding layer formed on the doped silica waveguiding structure.

2. An optical device according to claim 1 wherein the doped silica includes a dopant selected from fluorine, phosphorus, titanium, and mixtures thereof.

3. An optical device according to claim 1 wherein the optical device is selected from optical filters, multiplexers, demultiplexers, beam splitters, and optical taps.

4. An optical device according to claim 1 wherein the refractive index of the doped silica substrate is selected such that the doped silica substrate is a lower cladding layer for the waveguiding structure.

5. An optical device according to claim 1 wherein the doped silica substrate has a thickness of approximately 0.5–1.0 mm.

6. An optical device comprising:
   a doped silica substrate having a first coefficient of thermal expansion;
   a doped silica waveguiding structure formed on the doped silica substrate, the doped silica waveguiding structure having a second coefficient of thermal expansion, the first coefficient of thermal expansion being approximately 90% to 110% of the second coefficient of thermal expansion; and
   a cladding layer formed on the doped silica waveguiding structure.

7. An optical device according to claim 6 wherein the doped silica includes a dopant selected from fluorine, phosphorus, titanium, and mixtures thereof.

8. An optical device according to claim 6 wherein the optical device is selected from optical filters, multiplexers, demultiplexers, beam splitters, and optical taps.

9. An optical device according to claim 6 wherein the refractive index of the doped silica substrate is selected such that the doped silica substrate is a lower cladding layer for the waveguiding structure.

10. An optical device according to claim 6 wherein the doped silica substrate has a thickness of approximately 0.5–1.0 mm.

11. An optical device comprising:
    a doped silica substrate, the doped silica substrate having a doping gradient from a lower surface to an upper surface, the doping level at the upper surface having associated therewith a first coefficient of thermal expansion;
    a doped silica waveguiding structure formed on the upper surface of the doped silica substrate, the doped silica waveguiding structure having a second coefficient of thermal expansion, the first coefficient of thermal expansion being approximately 90% to 110% of the second coefficient of thermal expansion; and
    a cladding layer formed on the doped silica waveguiding structure.

12. An optical device according to claim 11 wherein the doped silica includes a dopant selected from fluorine, phosphorus, titanium, and mixtures thereof.

13. An optical device according to claim 11 wherein the optical device is selected from optical filters, multiplexers, demultiplexers, beam splitters, and optical taps.

14. An optical device according to claim 11 wherein the refractive index of the upper surface of the doped silica substrate is selected such that the upper surface of the doped silica substrate is a lower cladding layer for the waveguiding structure.

15. An optical device according to claim 11 wherein the doped silica substrate has a thickness of approximately 0.5–1.0 mm.

* * * * *